(12) United States Patent
Gibis

(10) Patent No.: US 9,298,533 B2
(45) Date of Patent: Mar. 29, 2016

(54) PORTABLE DATA CARRIER HAVING OPERATING ERROR COUNTER

(75) Inventor: Oliver Gibis, München (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 38 days.

(21) Appl. No.: 13/993,425

(22) PCT Filed: Dec. 9, 2011

(86) PCT No.: PCT/EP2011/006228
§ 371 (c)(1),
(2), (4) Date: Jun. 12, 2013

(87) PCT Pub. No.: WO2012/079730
PCT Pub. Date: Jun. 21, 2012

(65) Prior Publication Data
US 2013/0268811 A1  Oct. 10, 2013

(30) Foreign Application Priority Data
Dec. 14, 2010 (DE) .......................... 10 2010 054 446

(51) Int. Cl.
| | |
|---|---|
| G06F 12/14 | (2006.01) |
| G06F 11/07 | (2006.01) |
| G06F 21/72 | (2013.01) |
| G07F 7/08 | (2006.01) |
| G07F 7/10 | (2006.01) |
| G06F 7/04 | (2006.01) |
| G06F 12/00 | (2006.01) |
| G06F 13/00 | (2006.01) |
| G06F 17/30 | (2006.01) |

(52) U.S. Cl.
CPC .............. G06F 11/076 (2013.01); G06F 21/72 (2013.01); G07F 7/0813 (2013.01); G07F 7/1016 (2013.01)

(58) Field of Classification Search
None
See application file for complete search history.

(56) References Cited

U.S. PATENT DOCUMENTS

| | | | | |
|---|---|---|---|---|
| 5,801,938 A | * | 9/1998 | Kalantery | ........... G06F 17/5009 700/2 |
| 6,105,148 A | * | 8/2000 | Chung et al. | .................... 714/16 |
| 6,356,615 B1 | * | 3/2002 | Coon | .................. G06F 11/3409 377/16 |

(Continued)

FOREIGN PATENT DOCUMENTS

| | | |
|---|---|---|
| CA | 2247475 A1 | 7/1998 |
| CN | 1672136 A | 9/2005 |

(Continued)

OTHER PUBLICATIONS

International Search Report in PCT/EP2011/006228, Feb. 28, 2012.

(Continued)

Primary Examiner — Shin-Hon Chen
(74) Attorney, Agent, or Firm — Workman Nydegger

(57) ABSTRACT

In a method in a portable data carrier for securing the data carrier against external attacks on the data carrier, there is employed at least one counter in the data carrier. A specified command is secured here such that it is executed by the data carrier only when the at least one counter lies in a specified, permissible values range, in particular does not undershoot a specified minimum value. The at least one counter is actuated, normally decremented, according to the invention when it is recognized on the basis of a rollback buffer of the data carrier that a preceding execution of a command has been disturbed.

15 Claims, 2 Drawing Sheets

(56) References Cited

U.S. PATENT DOCUMENTS

| | | |
|---|---|---|
| 6,996,678 B1 | 2/2006 | Sharma |
| 2001/0010331 A1* | 8/2001 | Hazard .......................... 235/380 |
| 2004/0003244 A1* | 1/2004 | England et al. ............... 713/168 |
| 2006/0129611 A1* | 6/2006 | Adkins et al. ................. 707/202 |
| 2008/0010407 A1 | 1/2008 | Gaertner et al. |
| 2008/0209550 A1* | 8/2008 | Di Iorio ......................... 726/22 |
| 2008/0270677 A1* | 10/2008 | Kolakowski ................... 711/103 |
| 2009/0019551 A1* | 1/2009 | Haga et al. ...................... 726/27 |
| 2009/0235032 A1 | 9/2009 | Hoane, Jr. |
| 2009/0292919 A1* | 11/2009 | England ......................... 713/168 |
| 2010/0145910 A1* | 6/2010 | Zhao ................. G06F 17/30348  707/620 |
| 2011/0010775 A1* | 1/2011 | Modave et al. ................. 726/26 |
| 2011/0029828 A1* | 2/2011 | Bancel et al. ................. 714/724 |
| 2011/0119762 A1* | 5/2011 | Teglia ............................. 726/23 |
| 2011/0126049 A1* | 5/2011 | Kessler et al. ................. 714/16 |

FOREIGN PATENT DOCUMENTS

| | | |
|---|---|---|
| DE | 101 41 926 A1 | 4/2003 |
| EP | 1 056 058 A1 | 11/2000 |
| WO | 2008/084016 A1 | 7/2008 |

OTHER PUBLICATIONS

International Preliminary Report on Patentability and Written Opinion in PCT/EP2011/006228, Jun. 27, 2013.

* cited by examiner

PORTABLE DATA CARRIER HAVING OPERATING ERROR COUNTER

BACKGROUND OF THE INVENTION

A. Field of the Invention

The present invention relates to a portable data carrier having an operating error counter, and to a method for securing a command in the data carrier by means of an operating error counter.

Operating error counters are used in connection with portable data carriers, for example chip cards, for limiting the unauthorized carrying out of security-relevant commands with the aim of attaining security-relevant data of the data carrier. It is known here for example to limit the number of successive false inputs. If this number is overshot the data carrier is blocked. By means of an operating error counter it is also possible to recognize attacks of other kinds on arbitrary commands executed on the data carrier. If for example a computation executed by a command is disturbed by an external action on the data carrier with the aim of spying out secret data involved in the computation on the basis of the disturbed result, this can be recognized inside the data carrier by the computation being repeated before a result is output. The output of a computation result is effected only if both computations arrive at an identical result. Otherwise it can be assumed that one of the computations has been attacked, and a corresponding operating error counter records this attack.

However, an attacker executing a hereinabove described attack on a command of a data carrier, which has been stolen for example, can recognize by an analysis of certain data-carrier parameters, for example by the current consumption, whether or not the comparison of the two computation results yields identity. Thus, the attacker has the possibility to deactivate the data carrier by interrupting the power supply before the operating error counter can record the attack. In this way the attacker can suspend the operating error counter, as it were, and carry out the attack as often as he pleases.

For this reason a newer practice is to already decrement an operating error counter before the executing of the security-relevant command, starting out from a specified positive initial value, and to increment it only when the command has been executed without interruption. In this way a hereinabove described attack can be safely recognized by the operating error counter, because an incrementing of the counter no longer takes place upon an interruption of the power supply during the carrying out of the command. At the next call-up of the command the reading of the operating error counter is accordingly reduced by one. If it is provided that the command is executed in the data carrier only as long as the operating error counter has a positive value, the number of attacks on the command is limited by the initial value of the operating error counter. Extensive attacking of the command can be safely prevented in this way.

But this kind of operating error counter also has disadvantages. On the one hand, the decrementing of the operating error counter before the execution of each security-relevant command and the subsequent incrementing mean a performance loss in all cases when no attack takes place. On the other hand, the write accesses to be repeatedly carried out for decrementing and subsequently incrementing the operating error counter can impair the durability of corresponding memory areas in the data carrier, for example given by EEPROM memory cells.

SUMMARY OF THE INVENTION

The object of the present invention is to propose a method for securing a data carrier by means of an operating error counter, which can be implemented so as to save resources and spare resources.

In a method according to the invention in a portable data carrier for securing the data carrier against external attacks on the data carrier, there is employed at least one counter in the data carrier. A specified command is secured here such that it is only executed by the data carrier when the at least one counter lies in a specified, permissible values range, in particular does not undershoot a specified minimum value. The at least one counter is actuated, normally decremented, according to the invention when it is recognized on the basis of a rollback buffer of the data carrier that a preceding execution of a command has been disturbed.

The actuating of the counter corresponds for example to a decrementing of the counter, as mentioned. In the repeated error case the permissible values range is then left downward, i.e. a specified minimum value is undershot. It is self-evident that the counter can also be configured according to a second variant, analogously to the above-mentioned first variant, such that the specified command is executed only when the at least one counter does not leave the specified values range upward, i.e. does not exceed a specified maximum value. Here, the at least one counter is actuated upon recognition of a disturbance by being incremented. For reasons of simplicity and comprehension, reference will hereinafter usually be made only to the first-mentioned of the two variants, which is fully equivalent to the second variant functionally.

A portable data carrier according to the invention therefore comprises at least one memory and a processor which is configured to execute a command stored in the memory, as well as at least one counter for securing the command. The data carrier is configured here to execute the specified command only when the at least one counter lies in a specified values range. The data carrier is configured to recognize on the basis of a rollback buffer of the data carrier whether a preceding execution of a command has been disturbed. Further, the data carrier is configured to actuate the counter when such a disturbance has been recognized.

In this way there can be obtained a resource-saving and resource-sparing securing of the data carrier or of individual commands against error attacks. The at least one counter serving as an operating error counter is only actuated in the concrete error case, i.e. when an attack has actually taken place. Write accesses, however, are not already effected before each execution of a command to be secured—and additionally after the command if no attack has taken place. In this way it is possible to avoid a great number of write accesses, thereby substantially increasing the performance of the data carrier as a whole. Further, the resources of the data carrier, in particular corresponding memory areas of a non-volatile memory, for example of an EEPROM memory, are spared in that the number of write accesses to these memory areas which include the at least one counter is considerably reduced. This increases the life of the corresponding memory areas and thus also the life of the data carrier.

On the basis of the rollback buffer it can be recognized, as described in detail hereinafter, whether a preceding execution of a command has been disturbed. It is possible that the at least one counter of the data carrier is configured to count different disturbances of the data carrier, i.e. independently of the specific command that has been disturbed. Further, it is possible that the at least one counter is actuated only when it is recognized on the basis of a rollback buffer of the data carrier that a preceding execution of the concrete, specified command has been disturbed. That is to say, the counter is configured according to this embodiment to count only disturbances of the specified command in order to secure the specified command. In the data carrier, different counters can be provided simultaneously, as described hereinafter. There can be counters that recognize, on the basis of the rollback buffer, disturbances relating to individual, concrete commands, and counters that count disturbances relating to the data carrier as such or at least a plurality of commands.

A disturbance of a preceding execution of a command is preferably recognized by a valid entry being present in the rollback buffer before the current execution of the specified command. The meaning of a valid entry will be described more precisely hereinafter.

The rollback buffer is employed in general to secure a memory area of the data carrier against inconsistency due to a disturbed write access to the memory area. The rollback buffer can comprise entries for a plurality of different memory areas. Primarily, the rollback buffer thus serves in the known way to guarantee the integrity of the data stock of the data carrier.

If a write access to a memory area of a memory of the data carrier is disturbed before the write access is successfully completed, there can arise data losses or inconsistencies with regard to the data to be written or the data previously stored in the memory area. To avoid this, the rollback buffer comprises, at least for the duration of the write access, the original content of the memory area before the onset of the write access. Normally, the entry comprises further information, for example the size of the temporarily stored datum, the address of the memory area where the datum is stored in the memory, and the like. The corresponding entry of the rollback buffer is then marked as "valid". The "valid" marking means that the data currently stored temporarily in the entry must be written back to the accordingly designated memory area in the error case. When the write access to the memory or the command comprising this write access has been successfully completed, the entry securing the write access is marked as "invalid" in the rollback buffer. An "invalid" entry need no longer be written back to the memory if a corresponding check of the rollback buffer is effected, e.g. upon activation of the data carrier, because the corresponding write operation has already been successfully completed before.

If an error now occurs during the write access, for example the power supply to the data carrier is interrupted, it can be recognized upon reactivation of the data carrier that a valid entry is present in the rollback buffer. To restore the integrity of the data stock of the data carrier, the entry stored in the entry of the rollback buffer is now first written back to the corresponding memory area of the data carrier designated in the entry. Then the entry of the rollback buffer is marked as invalid—i.e. in particular also reusable for temporary storage purposes—analogously to the case of a successful completion of the write operation.

On the other hand, there can now be recognized on the basis of the rollback buffer, as described, an error attack on the data carrier quite generally, for example in the form of an interruption of the power supply, by a valid entry being present in the rollback buffer before the execution of a command. For this purpose, the status of the rollback buffer is checked after the activation of the data carrier, before the execution of commands. That is to say, the data carrier checks whether valid entries are present in the rollback buffer. This means that a preceding command—more precisely, a write access of a preceding command—has been disturbed before the command or write access could be fully and successfully completed. This valid entry of the rollback buffer therefore indicates in particular an attack on the data carrier. This attack can then be recorded by actuating the at least one counter. The execution of the command is then made dependent in the described manner on whether the counter still lies within the valid values range.

As mentioned, the rollback buffer can comprise entries for different memory areas. These different memory areas can for their part be associated with different commands, e.g. such that a write access to a certain memory area is effected from a command associated with said memory area. The rollback buffer can now be checked as to whether a specified entry is marked as valid. A validity of said specified entry then corresponds to the case that the disturbed write access has taken place during an execution of the specified command that is associated with the entry in the described manner. The at least one counter is in this case thus only actuated when the corresponding specified command has been disturbed.

On the other hand, a counter of the data carrier can be configured, as already indicated hereinabove, such that it counts disturbances of the data carrier quite generally. Such a counter is actuated when any entry of the rollback buffer is recognized as valid after the data carrier is switched on, independently of whether this entry is associated with a certain command and, if so, which command this is. Mixed forms are possible, i.e. counters that count the disturbances of a command from a specified set of commands and for this purpose depend on a corresponding set of entries of the rollback buffer.

As described, there can be recognized on the basis of the rollback buffer only disturbances of the execution of those commands that access a memory of the data carrier in a writing manner. If no write access is effected during the execution of a command, however, no changes of the rollback buffer result. Such commands can be additionally secured in the known way, by the at least one counter being decremented before an execution of the command and being incremented only when the command has been executed without interruption. In this way, an effective securing of these commands without write access is also guaranteed. Because most security-relevant commands provide at least one write access to the memory of the data carrier—and can therefore be secured according to the invention—this known type of securing for those commands comprising no write accesses is hardly of any consequence altogether, and at most slightly impairs the resources of the data carrier.

According to a preferred embodiment, the at least one counter is also set after the issuance of the data carrier to a user. That is to say, besides the initial setting of the counter upon the manufacture of the data carrier there is also the possibility to reset the counter when the data carrier has already been put into service. Within the framework of the present invention, a setting of the counter designates both a setting of a value of the counter and a setting of a permissible values range of the counter as well as of a permissible progression pattern of the counter.

In this way it is possible to enable an authorized body to set the counter at any time. This holds in particular even when the data carrier is already in use. It is thereby possible to issue the counter to the user with a rather low initial value at the time of issuance, on the one hand. This guarantees a high security of the data carrier and of the commands executable thereon. This holds in particular if the user should lose the data carrier, for example through theft. On the other hand, it is possible to raise the counter again, for example to the original initial value, by means of a suitable setting after some time, when it has already been reduced, starting out from the initial value, due to inadvertent operating error by an authorized user or due to technical failures. In this way an unintended blocking of the data carrier can be prevented. This is expedient when the number of inadvertent, authorized operating errors and technical defects that have led to a decrementing of the counter have added up, in the course of the use of the data carrier, to a number that would reach the value of the initial value. Thus, the multiple-time counter setting according to the invention makes it possible to prevent the blocking of the data carrier. This improves the operability and reliability of the use of the data carrier, without restricting the security.

The counter can be kept so low at any time in the life cycle of the data carrier that an attack by an unauthorized party on a specified command is only possible to an extremely limited extent. At the same time it is possible to avoid a blocking of the data carrier through occasional, inadvertent or technically induced operating error. A counter that is decremented for such reasons can be newly and suitably set even after the manufacture of the data carrier, i.e. even when the data carrier has already been issued to the user and might have been in operation for some time.

As authorized bodies entitled to set the counter, several entities come into consideration. Such a setting can be allowed for example to the user of the data carrier. A body issuing the data carrier can also perform a setting of the counter. Finally, such setting can likewise be performed by the data carrier itself. Further, the requirements that must be fulfilled for the relevant entity to be able to perform a setting can vary. Normally, a setting of the at least one counter is only possible after successful authentication to the data carrier. Finally, the value to which the counter is set upon the setting, or the permissible values range, or the permissible progression of the counter, can be freely specified, on the one hand. On the other hand, the newly set values of the counter can depend on external specifications or a previous progression of the counter reading.

According to a further aspect, which is not limited to the embodiment of the method with a settable counter, there are provided a plurality of counters in the data carrier, as mentioned. A first counter is employed here for securing a first command, and a second counter different from the first counter is employed for securing a second command normally different from the first command. The number of counters can vary. It is further possible that a plurality of commands are secured by means of one counter. Each of the counters—if settable—is separately settable, as described hereinabove. In this way different commands can be secured differently in an appropriate manner.

In the event that the at least one counter leaves the specified values range, the data carrier or at least a command that is secured by the at least one counter is deactivated. Then no further attacks on the data carrier or command are possible. Sensitive data cannot get into unauthorized hands. Because an erroneous deactivation of the data carrier or command is virtually excluded by the counter being set newly and suitably as required to compensate occasional operating errors or technical difficulties, a deactivation of the data carrier indicates an attack on the data carrier with very high probability.

BRIEF DESCRIPTION OF THE DRAWINGS

Hereinafter the present invention will be explained by way of example with reference to the attached drawings. Therein are shown.

DETAILED DESCRIPTION OF THE PREFERRED EMBODIMENTS

Figure 1:
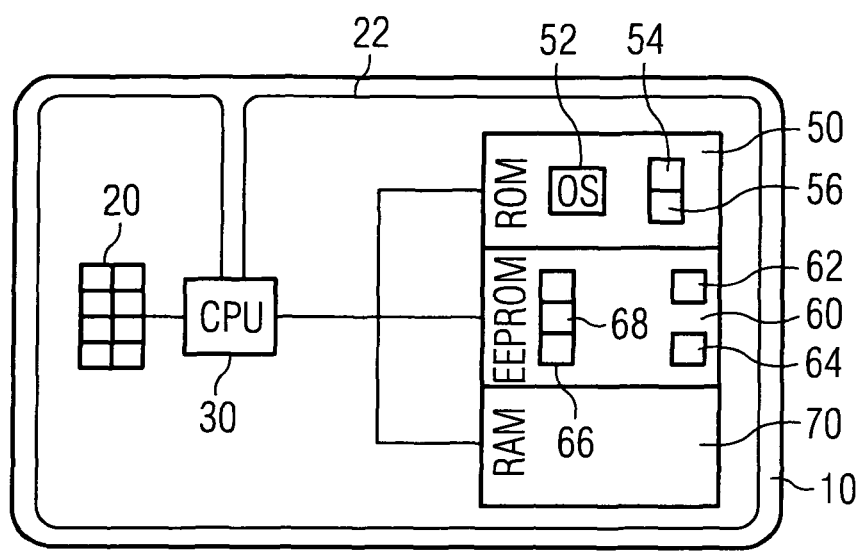
FIG. 1 a preferred embodiment of a data carrier according to the invention.

A portable data carrier 10, which is represented here as a chip card, comprises two different data communication interfaces 20, 22. The first data communication interface 20 is configured as a contact pad. By means thereof the data carrier 10 can be contacted via a contact-type reading device, for example an ordinary chip-card terminal. The second data communication interface 22 serves for contactless data communication and is configured as an antenna coil. The supplying of the data carrier 10 with power is respectively effected in the known way via the respective data communication interface 20, 22 in the respective operating mode, contact-type or contactless. It is possible that the data carrier 10 additionally comprises its own power supply, for example in the form of a battery (not shown). Alternatively, the data carrier 10 can also be configured for only one operating mode, contact-type or contactless.

Further, the data carrier 10 comprises a processor (CPU 30) and a row of memories 50, 60, 70.

A non-rewritable, non-volatile ROM memory 50 comprises an operating system (OS) 52 controlling the data carrier 10, as well as applications 54, 56 which are configured to support the execution of security-relevant commands on the data carrier 10, for example upon an authentication, upon the computation of a cryptographic function, or the like. The operating system 52, or at least parts thereof, as well as the applications 54, 56 can alternatively also be stored in the rewritable, non-volatile EEPROM memory 60. Therein can be stored further applications, for example different user applications, as well as counters 62, 64 for securing the security-relevant commands 54, 56. In the memory 60 there is further provided a rollback buffer 66.

The function of the counters 62, 64 as well as of the rollback buffer 66 will be described more precisely hereinafter and with reference to FIG. 2.

The rollback buffer 66 serves in the known way for securing the integrity of the data stock of the data carrier 10. To secure a write access to an address in the memory 60, those data stored before the write access in the memory area to be written are stored temporarily in an entry 68 of the rollback buffer 66. Then there is effected the write access to the memory area of the memory 60. If the latter has been completed successfully, i.e. in particular without disturbance or interruption, the entry 68 in the rollback buffer 66 is dispensable again. However, if the write access has been disturbed, for example by an interruption of the power supply of the data carrier 10, the data stock of the data carrier 10 could become inconsistent through portions of the data to be written having already been written to the memory area, for example, while portions of the data previously stored there still remain in the subareas not yet written. To remedy such an inconsistency, the entry 68 in the rollback buffer 66 holding the data set that was stored in the memory area before the disturbed write access is written back there. This can be done for example immediately after a restart of the data carrier 10.

Normally, the rollback buffer 66, as mentioned, is located in the non-volatile memory 60 and comprises different entries 68. Each of the entries 68 comprises for example a status byte, an address field, a size field, a data field and a check field. The status field indicates whether the entry is currently "valid" or "invalid". A "valid" entry comprises data to be secured that are the object of a write access to the memory 60 of the data carrier 10, the write access not yet having been fully completed successfully. After the activation of the data carrier it can be recognized on the basis of a "valid" entry that a write access has previously been disturbed and the corresponding data set in the entry has to be written back to the memory. However, an "invalid" entry comprises no relevant data, thus being employable as a buffer. The address field serves to take up an address with reference to the memory 60 at which address the data set that can be stored in the data field of the entry 68 for securing purposes is stored. The size of the data field is indicated by the size field of the entry 68. Finally, the check field can comprise a check sum by means of which the content of the hereinabove described fields is secured again. The rollback buffer 66 can itself comprise, besides the entries 68, a status field which indicates for example whether valid entries are present or whether the memory currently has no more buffer capacities.

Figure 2:
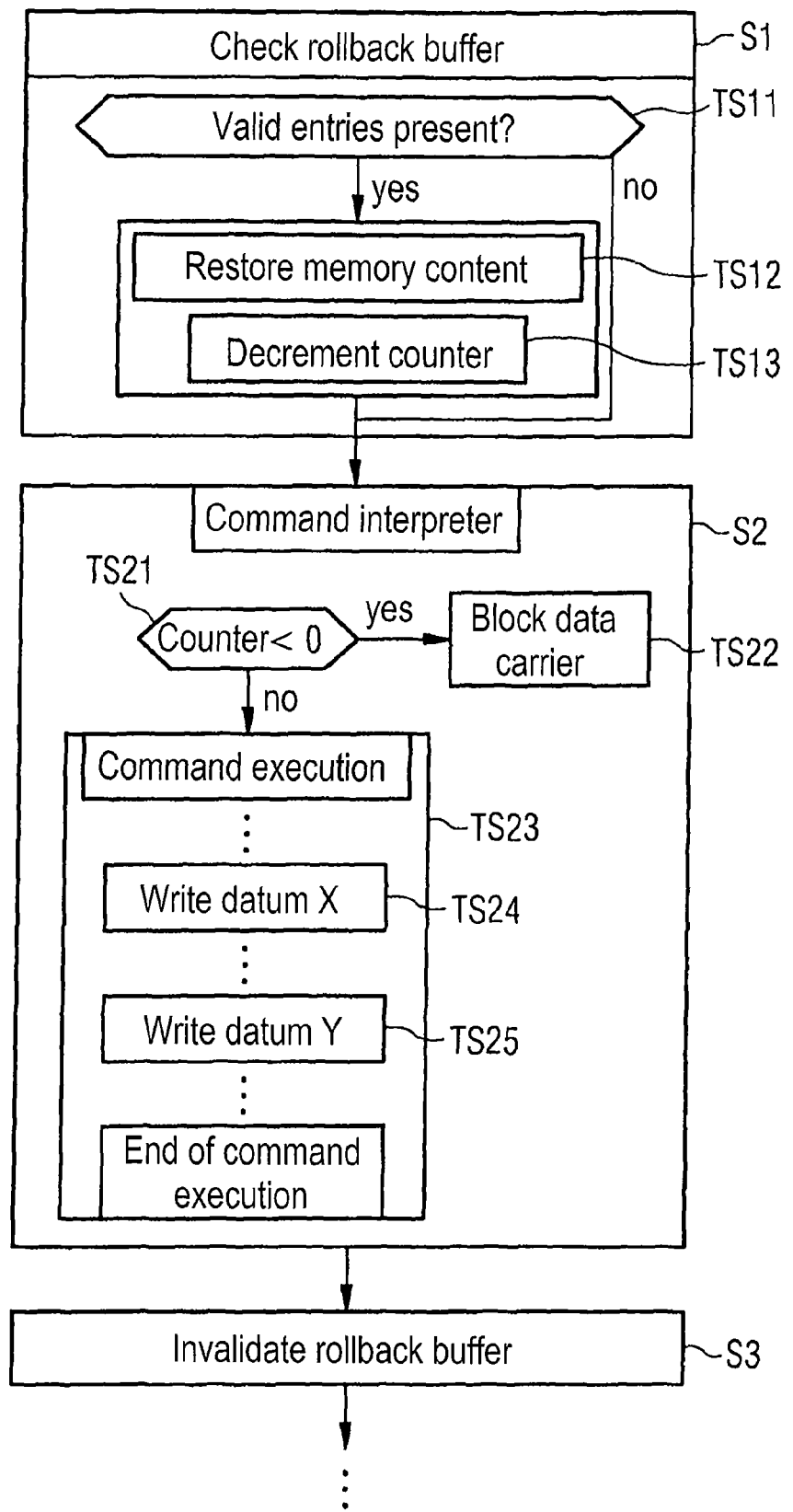
FIG. 2 steps of a preferred embodiment of the method according to the invention.

With reference to FIG. 2, steps of a preferred embodiment of a method for securing a command against error attacks will hereinafter be described.

After the data carrier 10 has been activated and put into operation in the known way, for example through the command sequence "ICC_ON/RESET→startup( )→main( )→Send ATR", the data carrier 10 checks the rollback buffer 66 in a step S1.

In so doing, it is first checked in substep TS11 whether valid entries 68 are present in the rollback buffer 66. This check can relate to the status field of the rollback buffer 66, on the one hand, and to the status fields of the individual entries 68, on the other hand. If a valid entry 68 is recognized in substep TS11, the content of the corresponding memory area of the memory 60 is restored in substep TS12 in the hereinabove described manner, for example by means of a function "v_RestoreRollbackBuffer( )". In a further substep TS13 at least one of the counters 62, 64 is decremented.

The presence of a valid entry 68 in the rollback buffer 66 means that a preceding execution of a command of the data carrier 10 has been disturbed or interrupted. More precisely, this means that a write access to the memory 60 of the data carrier 10 that was supposed to be carried out within a command has been disturbed or interrupted.

The cause for such a disturbance may be an attack on the data carrier 10 or a certain command of the data carrier 10, for example a targeted interruption of the power supply to the data carrier 10. The counters 62, 64 are configured to count such attacks. A command of the data carrier 10 is executed only when the counter 62, 64 associated with the command lies within a specified values range, for example is not negative. Thus, it is made impossible for an attacker to attack a command too often. Each time an attack on the command is recognized, the counter 62, 64 associated with the command is decremented accordingly, as described.

The validity of an entry 68 of the rollback buffer 66 can mean here for example that a write access of a certain command associated with said entry has been disturbed. Said association can be effected by the corresponding command comprising a write access that is always effected to a specified address in the memory 60. This address is then stored in the address field of the entry 68. Accordingly, precisely the counter 62, 64 associated with said command would then be decremented in TS13.

On the other hand, the data carrier 10 can comprise for example a counter 62, 64 that is to register all attacks on the data carrier 10. Such a counter is always decremented in TS13, independently of which of the entries 68 of the data carrier 10 is marked as "valid". The presence of an attack on the data carrier 10 can already be recognized by a "valid" status entry of the rollback buffer 66.

After the check of the rollback buffer 66 is completed in step S1, a received command is transferred to the command interpreter and executed there in step S2.

In so doing, it is examined in a first substep TS21, as already described hereinabove, whether the counter 62, 64 associated with the command lies in a permissible values range, here for example is not negative.

If the counter 62, 64 is negative, this means that the permissible number of attacks or disturbed executions of the command is already exceeded. In substep TS22 the data carrier 10 is hence blocked for protecting security-relevant data thereon. Further attacks on the data carrier 10 with the risk of sensitive data being spied out are thus no longer possible. It is alternatively also possible that, instead of the data carrier 10, only the corresponding command is blocked, while the data carrier 10 otherwise remains ready for operation.

If the counter 62, 64 still lies in the specified values range, however, the command is executed in substep TS23. In so doing, different write accesses to the memory 60 of the data carrier 10 can be effected, for example in substep TS24 with reference to the datum X or in substep TS25 with reference to the datum Y. These write accesses are secured by means of the rollback buffer 66, as described hereinabove. That is to say, each of these write accesses temporarily produces a valid entry 68 in the rollback buffer 66.

After successful completion of the command, the rollback buffer 66 is invalidated again in step S3, i.e. the corresponding status fields of the entries 68 that have meanwhile been marked as "valid" are marked as "invalid" again. This can be effected for example by means of a command "Invalidate RollbackBuffer".

Such an invalidation of entries 68 of the rollback buffer 66 can relate to all currently valid entries 68, i.e. be applied globally to the entire rollback buffer 66. It can also be expedient, however, to individually mark single "valid" entries as "invalid" again immediately as soon as the corresponding secured write access has been completed successfully. Such an invalidation can also already take place during a command execution TS23. This holds in particular with reference to a write access relating to a special data object. Such a data object, for example a so-called "Application Transaction Counter", ATC, or a "PIN Try Counter", PTC, must be bindingly set immediately after a successful write in the file system of the data carrier. That is to say, the newly written value of the data object already holds in the further course of the ongoing command execution.

In any case there is recognized an attack on a command which attack is effected as long as the write access has not yet been fully completed. The data integrity is thus guaranteed and the number of attacks can be kept small by means of the corresponding counters 62, 64. Security-relevant data in the data carrier 10 are therefore effectively protected both against spying out and against destruction in the data carrier 10.

Occasionally it can happen that a command execution has not been interrupted due to an attack, but rather due to an ordinary technical error, for example by the data carrier 10 having been moved too far away from the reading device in the contactless operating mode. Other disturbances are possible.

To prevent an unintended blocking of the data carrier 10 based on such disturbances being interpreted as attacks in the described manner by the data carrier 10—with corresponding decrementing of affected counters—it would be possible for the initial value of the counter 62, 64 starting out from which decrementing is done in TS13 to be set accordingly high upon the manufacture of the data carrier 10. However, this would give an attacker the possibility to launch a corresponding number of attacks on the data carrier 10 before the data carrier 10 is deactivated. With every attack there is a higher probability of sensitive data leaving the data carrier 10. If the initial value is set very low upon the manufacture of the data carrier, the latter is protected rather well from external attacks. However, an accordingly small number of unintended operating errors or technical defects can result in an unintended shutdown of the data carrier 10.

For that reason the data carrier 10 is additionally configured such that the counters 62, 64 can be newly set multiple times, even after the issuance of the data carrier 10 to a user. This holds for the value of the counters 62, 64 themselves as well as for the values ranges that the counters 62, 64 must keep within during time spans that are specified or likewise definable upon the setting of the counters 62, 64. The authorization for setting the counters 62, 64 can be granted to a user as well as to a body issuing the data carrier 10. This normally requires a respective authentication to the data carrier 10. Finally, the setting can also be effected through the data carrier 10 itself, for example in dependence on a progression of the counters 62, 64 in the past. It is further possible that different ones of the stated conditions must be present simultaneously in order that a setting of the counters 62, 64 can be effected.

The different counters 62, 64 are respectively settable separately. A setting of one counter 62, 64 is independent of the setting of the other counter 64, 62. Thus, different commands can be secured specifically. When for example the counter 62 secures a command that is executed in the contactless operating mode, it is expedient to set this counter 62 higher with regard to the initial value than the counter 64 which secures a corresponding command that is executed in the contact-type operating mode. Unintended interruptions of the power supply are to be expected more often in connection with the contactless operating mode than in the contact-type operating mode.

A user of the data carrier 10 can carry out a setting of the counters 62, 64 when he authenticates himself successfully to the data carrier 10. This can be effected for example by inputting a secret datum, for example a PIN. For the input of such a secret datum the data carrier 10 can have an input device (not shown), for example a keyboard. It is also possible that, for the input of such data to the data carrier 10, the same is connected via one of the interfaces 20, 22 to a suitable reading device having an input device, for example a chip-card terminal. It is possible that the user can then perform the settings with regard to the counter 62, 64 himself. Alternatively, the data carrier 10 can also restore the setting of the counters 62, 64 to internally specified values as soon as a successful authentication of the user is present.

The setting of the counters 62, 64 can also be carried out by a body issuing the data carrier 10, for example a bank. For this purpose, the data carrier 10 must be connected to said body. This can be done for example via a suitable reading device which is for its part connected to the issuing body, for example via the Internet. To obtain an authorization for setting the counters 62, 64, the issuing body must authenticate itself to the data carrier 10 in the known way. Thereafter it is possible to set the counters 62, 64 according to the specifications of the issuing body. In this case as well, the setting of the counter can be performed by the data carrier 10 itself, after successful authentication of the issuing body. The data carrier 10 can provide for this for example respectively after the expiry of a specified time interval. The expiry of the time interval can be taken by the data carrier 10 from an internal time measuring device or a certified time stamp obtained from the issuing body.

The invention claimed is:

1. A method in a portable data carrier, comprising:
   executing a specified command by the data carrier only when at least one counter of the data carrier lies in a specified values range, each command having its own counter that separately secures execution of that command, wherein the at least one counter is actuated only when there is a valid entry present in a rollback buffer of the data carrier,
   the valid entry indicating that a preceding execution of a command has been interrupted by a disturbance, a default invalid entry indicating no disturbance, and
   upon finding the valid entry, the data carrier writing original content of memory temporarily stored in the rollback buffer back to a memory area, wherein the data carrier or at least a command that is secured by the at least one counter is deactivated when the at least one counter leaves the specified values range.

2. The method according to claim 1, wherein the recognition is of a valid entry being present in the rollback buffer before the current execution of the specified command.

3. The method according to claim 1, wherein the rollback buffer is employed to secure a memory area of the data carrier against inconsistency due to a disturbed write access to the memory area.

4. The method according to claim 3, wherein the write access takes place during an execution of the specified command.

5. The method according to claim 1, wherein the at least one counter is set after an issuance of the data carrier to a user.

6. The method according to claim 5, wherein the at least one counter is set after a successful authentication to the data carrier.

7. The method according to claim 1, wherein more than one counter is provided, a first counter being employed for securing a first command and a second counter being employed for securing a second command.

8. The method according to claim 1, wherein the at least one counter is employed for securing a plurality of commands.

9. The method in claim 1, wherein the original content is written back to a corresponding memory location.

10. The method in claim 1, wherein the original content of memory comprises the original content of memory before the onset of write access of the command.

11. The method according to claim 1, wherein a setting and a values range of the at least one counter is set in dependence on a progression of the counter in the past by the portable data carrier itself after an expiry of a specified time interval.

12. A portable data carrier comprising at least one memory and a processor which is configured to execute a command stored in the memory, as well as at least one counter for securing the command, the data carrier being configured to execute the command only when the at least one counter lies in a specified values range, each command having its own counter that separately secures execution of that command, and wherein the data carrier is configured to recognize on the basis of a rollback buffer of the data carrier whether a preceding execution of a command has been disturbed, and is further configured to actuate the counter when such a disturbance has been recognized, the data carrier writing original content of memory temporarily stored in the rollback buffer back to memory area, wherein the data carrier or at least a command that is secured by the at least one counter is deactivated when the at least one counter leaves the specified values range.

13. The data carrier according to claim 12, wherein the at least one counter is configured to be settable after an issuance of the data carrier to a user.

14. A data carrier which is configured to carry out a method, comprising:
  executing a specified command by the data carrier only when at least one counter of the data carrier lies in a specified values range, each command having its own counter that separately secures execution of that command, wherein the at least one counter is actuated only when there is a valid entry present in a rollback buffer of the data carrier,
  the valid entry indicating that a preceding execution of a command has been interrupted by a disturbance, a default invalid entry indicating no disturbance, and
  upon finding the valid entry, the data carrier writing original content of memory temporarily stored in the rollback buffer back to a memory area, wherein the data carrier or at least a command that is secured by the at least one counter is deactivated when the at least one counter leaves the specified values range.

15. A method in a portable data carrier, the data carrier including at least one counter and a rollback buffer, the method comprising:
  executing a specified command by the data carrier only when the at least one counter of the data carrier lies in a specified values range, each command having its own counter that separately secures execution of that command, and wherein the at least one counter is actuated only upon a valid entry present in the rollback buffer of the data carrier,
  the valid entry indicating that a preceding execution of a command has been interrupted by a disturbance, a default invalid entry indicating no disturbance, and
  upon finding the valid entry, the data carrier writing original content of memory temporarily stored in the rollback buffer back to memory area, wherein the data carrier or at least a command that is secured by the at least one counter is deactivated when the at least one counter leaves the specified values range.

* * * * *